US011131752B2

(12) United States Patent
Yang et al.

(10) Patent No.: US 11,131,752 B2
(45) Date of Patent: Sep. 28, 2021

(54) VEHICLE NAVIGATION SYSTEM USING POSE ESTIMATION BASED ON POINT CLOUD

(71) Applicant: BEIJING DIDI INFINITY TECHNOLOGY AND DEVELOPMENT CO., LTD., Beijing (CN)

(72) Inventors: Sheng Yang, Beijing (CN); Teng Ma, Beijing (CN); Xing Nian, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 328 days.

(21) Appl. No.: 16/234,265

(22) Filed: Dec. 27, 2018

(65) Prior Publication Data

US 2020/0003869 A1 Jan. 2, 2020

Related U.S. Application Data

(63) Continuation of application No. PCT/CN2018/094118, filed on Jul. 2, 2018.

(51) Int. Cl.
*G01S 7/48* (2006.01)
*G01S 17/42* (2006.01)
*G01S 17/931* (2020.01)

(52) U.S. Cl.
CPC .......... *G01S 7/4808* (2013.01); *G01S 17/42* (2013.01); *G01S 17/931* (2020.01)

(58) Field of Classification Search
CPC ....... G01S 7/4808; G01S 17/931; G01S 17/42
See application file for complete search history.

(56) References Cited

U.S. PATENT DOCUMENTS 9,285,230 B1 * 3/2016 Silver ................... G01S 17/931
10,921,461 B2 * 2/2021 Tan ......................... G01S 17/86
(Continued)

FOREIGN PATENT DOCUMENTS

| CN | 104764457 A | 7/2015 |
|---|---|---|
| CN | 105279371 A | 1/2016 |

(Continued)

OTHER PUBLICATIONS

Kaulbersch, H. et al., "An EM Approach for Contour Tracking Based on Point Clouds", 2016 IEEE International Conference on Multisensor Fusion & Integration for Intelligent Systems(MFI), Sep. 19-21, 2016, pp. 529-533.

(Continued)

*Primary Examiner* — Bryan Bui
(74) *Attorney, Agent, or Firm* — Bayes PLLC (57) ABSTRACT

Embodiments of the disclosure provide systems and methods for positioning a vehicle. The system includes a communication interface configured to receive point cloud frames with respect to a scene and initial pose data of a vehicle captured by sensors equipped on the vehicle as the vehicle moves along a trajectory. The system also includes a storage configured to store the point cloud frames and the initial pose data. The system further includes a processor configured to estimate pose information of the vehicle associated with each of the point cloud frames based on the initial pose data and the point cloud frames. The processor is also configured to adjust the estimated pose information of the vehicle based on a model. The model includes a spatial relationship and a temporal relationship among the plurality of point cloud frames. The processor is further configured to position the vehicle based on the adjusted pose information.

20 Claims, 7 Drawing Sheets

(56) References Cited

U.S. PATENT DOCUMENTS

| | | |
|---|---|---|
| 2010/0106356 A1 | 4/2010 | Trepagnier et al. |
| 2015/0161441 A1 | 6/2015 | Robinson et al. |
| 2017/0039436 A1 | 2/2017 | Chen et al. |
| 2017/0277197 A1 | 9/2017 | Liao et al. |
| 2017/0316333 A1 | 11/2017 | Levinson et al. |
| 2017/0364759 A1 | 12/2017 | Creusot |
| 2017/0371348 A1 | 12/2017 | Mou |
| 2018/0017682 A1 | 1/2018 | Tan |
| 2018/0075643 A1 | 3/2018 | Sequeira et al. |
| 2018/0088234 A1 | 3/2018 | Scherer et al. |
| 2020/0106356 A1 | 4/2020 | Trepagnier et al. |

FOREIGN PATENT DOCUMENTS

| | | |
|---|---|---|
| CN | 105783873 A | 7/2016 |
| CN | 106908775 A | 7/2016 |
| CN | 108152831 A | 6/2018 |
| JP | 2017519973 A | 7/2017 |
| JP | 2018025490 A | 2/2018 |
| JP | 2018095254 A | 6/2018 |
| WO | 2013/045917 A1 | 4/2013 |
| WO | 2013045917 A1 | 4/2013 |
| WO | 2015/173034 A1 | 11/2015 |
| WO | 2015173034 A1 | 11/2015 |
| WO | 2018104563 A2 | 6/2018 |

OTHER PUBLICATIONS

The Third Examination Report issued in corresponding Australian Application No. 2018278849 dated Sep. 10, 2020, 6 pages.
Notice of Reasons for Rejection issued in corresponding Japanese Application No. 2018-564800 dated Sep. 23, 2020, 7 pages.
International Search Report in PCT/CN2018/094118 dated Mar. 27, 2019, 5 Pages.
Written Opinion in PCT/CN2018/094118 dated Mar. 27, 2019, 4 Pages.
Han, Mingrui et al., 3D Localization and Mapping of Outdoor Mobile Robots Using a LIDAR, journal of Huazhong University of Science & Technology, 43: 315-318, 2016.
Second Office action issued in Canadian Patent Application No. 3,026,914, dated Nov. 18, 2020, 4 pages.
Office Action in Canadian Application No. 3026914 dated Dec. 17, 2019, 4 pages.
First Examination report in Australian Application No. 2018278849 dated Nov. 14, 2019, 5 pages.
The Extended European Search Report in European Application No. 18807549.3 dated Aug. 27, 2019, 8 pages.
Decision to Grant a Patent issued in corresponding Japanese Application No. 2018-564800, dated Apr. 6, 2021, 4 pages.

* cited by examiner

Capture point cloud frames w.r.t. a scene and initial pose data of a vehicle as the vehicle moves along a trajectory
S702

Process the point cloud frames using trajectory interpolation based on the initial pose data
S704

Estimate point cloud pose info based on the point cloud frames
S706

Estimate pose info based on the point cloud pose info and the initial pose data
S708

Divide the point cloud frames into batches
S710

Adjust the estimated pose info based on a model
S712

Register the adjusted pose info with each point cloud frame
S714

Aggregate the point cloud frames based on the adjusted pose info
S716

Position the vehicle based on the adjusted pose info
S718

FIG. 7

VEHICLE NAVIGATION SYSTEM USING POSE ESTIMATION BASED ON POINT CLOUD

CROSS-REFERENCE TO RELATED APPLICATIONS

This application is a Continuation of International Application No. PCT/CN2018/094118, filed on Jul. 2, 2018, the entire contents of which are hereby incorporated by reference.

TECHNICAL FIELD

The present disclosure relates to navigation systems and methods for estimating vehicle pose, and more particularly to, navigation systems and methods for estimating pose of a vehicle using Light Detection And Ranging (LiDAR) and navigation sensors.

BACKGROUND

Autonomous driving technology relies heavily on an accurate map. For example, accuracy of the navigation map is critical to functions of autonomous driving vehicles, such as positioning, ambience recognition, decision making and control. High-resolution maps may be obtained by aggregating images and information acquired by various sensors, detectors, and other devices on vehicles as they drive around. For example, a vehicle may be equipped with multiple integrated sensors such as a LiDAR radar, a Global Positioning System (GPS) receiver, one or more Inertial Measurement Unit (IMU) sensors, and one or more cameras, to capture features of the road on which the vehicle is driving or the surrounding objects. Data captured may include, for example, center line or border line coordinates of a lane, coordinates and images of an object, such as a building, another vehicle, a landmark, a pedestrian, or a traffic sign.

Since high-resolution maps may be obtained by aggregating multiple point cloud frames based on their corresponding three-dimensional (3-D) pose information (e.g., positions and orientations) of the survey vehicle, the accuracy of the high-resolution map relies heavily on the accuracy of the positioning of the vehicle as it captures the point cloud data. Some known navigation systems utilize GPS, IMU, and wireless base stations to provide vehicle pose estimation with an accuracy of about 10 cm in normal conditions. However, in complex urban environments, in particular with poor GPS satellite signals (e.g., blocked by high-rise buildings, overpasses, etc.), the positioning accuracy can be greatly degraded. Other known navigation systems try to introduce real-time point clouds to improve the positioning accuracy, but still suffer from inaccuracy due to poor GPS satellite signals. The loss of positioning accuracy can cause the accumulation of positioning errors, which cannot be eliminated by the existing navigation systems used by survey vehicles. As a result, when a survey vehicle repeatedly passes the same scene, the resulting high-resolution maps can be different (i.e., the so called "global inconsistency" due to the unmatched point clouds of the same scene).

Embodiments of the disclosure address the above problems by improved navigation systems and methods for position a vehicle.

SUMMARY

Embodiments of the disclosure provide a navigation system for positioning a vehicle. The system may include a communication interface configured to receive a plurality of point cloud frames with respect to a scene and initial pose data of the vehicle captured by a plurality of sensors equipped on the vehicle as the vehicle moves along a trajectory. The system may also include a storage configured to store the plurality of point cloud frames and the initial pose data. The system may further include a processor configured to estimate pose information of the vehicle associated with each of the plurality of point cloud frames based on the initial pose data and the plurality of point cloud frames. The processor may be also configured to adjust the estimated pose information of the vehicle based on a model. The model includes a spatial relationship and a temporal relationship among the plurality of point cloud frames. The processor may be further configured to position the vehicle based on the adjusted pose information.

Embodiments of the disclosure also provide a method for positioning a vehicle. The method may include receiving a plurality of point cloud frames with respect to a scene and initial pose data of a vehicle captured by a plurality of sensors associated with the vehicle, as the vehicle moves along a trajectory. The method may also include estimating, by a processor, pose information of the vehicle associated with each of the plurality of point cloud frames based on the initial pose data and the plurality of point cloud frames. The method may further include adjusting, by the processor, the estimated pose information of the vehicle based on a model. The model includes a spatial relationship and a temporal relationship among the plurality of point cloud frames. The method may further include positioning the vehicle based on the adjusted pose information.

Embodiments of the disclosure further provide a non-transitory computer-readable medium having instructions stored thereon that, when executed by one or more processors, causes the one or more processors to perform operations. The operations may include receiving a plurality of point cloud frames with respect to a scene and initial pose data of a vehicle captured by a plurality of sensors associated with the vehicle, as the vehicle moves along a trajectory. The operations may include estimating pose information of the vehicle associated with each of the plurality of point cloud frames based on the initial pose data and the plurality of point cloud frames. The operations may further include adjusting the estimated pose information of the vehicle based on a model. The model includes a spatial relationship and a temporal relationship among the plurality of point cloud frames. The operations may further include positioning the vehicle based on the adjusted pose information.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
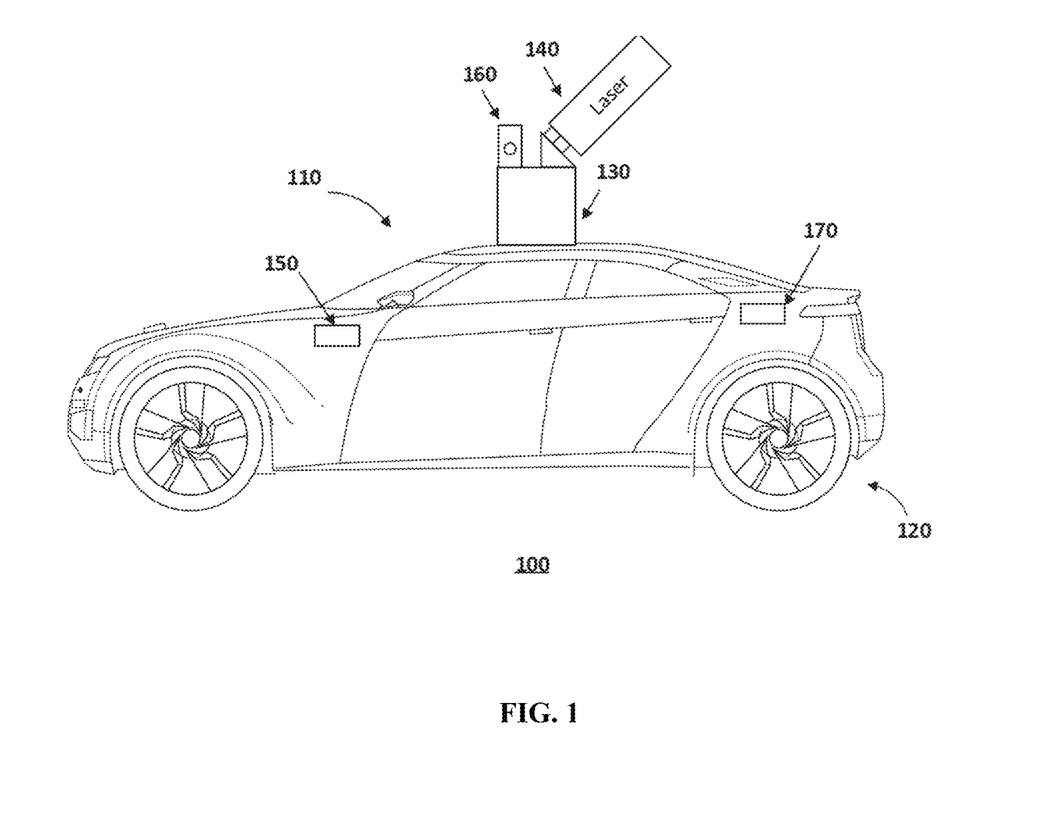
FIG. 1 illustrates a schematic diagram of an exemplary vehicle having sensors, according to embodiments of the disclosure.

FIG. 1 illustrates a schematic diagram of an exemplary vehicle 100 having a plurality of sensors 140, 150, and 160, according to embodiments of the disclosure. Consistent with some embodiments, vehicle 100 may be a survey vehicle configured for acquiring data for constructing a high-resolution map or three-dimensional (3-D) city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with sensors 140 and 160 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. Vehicle 100 may be additionally equipped with sensor 150 inside or outside body 110 using any suitable mounting mechanisms. It is contemplated that the manners in which each sensor 140, 150, or 160 can be equipped on vehicle 100 are not limited by the example shown in FIG. 1, and may be modified depending on the types of sensors 140-160 and/or vehicle 100 to achieve desirable sensing performance.

In some embodiments, sensors 140-160 may be configured to capture data as vehicle 100 moves along a trajectory. Consistent with the present disclosure, sensor 140 may be a LiDAR scanner/radar configured to scan the surrounding and acquire point clouds. LiDAR measures distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. Because a narrow laser beam can map physical features with very high resolution, a LiDAR scanner is particularly suitable for high-resolution map surveys. In some embodiments, a LiDAR scanner may capture a point cloud. As vehicle 100 moves along the trajectory, sensor 140 may acquire a series of point clouds at multiple time points (each known as a point cloud frame acquired at a time point).

As illustrated in FIG. 1, vehicle 100 may be additionally equipped with sensor 150, which may include sensors used in a navigation unit for positioning of vehicle 100, such as a GPS receiver and one or more IMU sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 150 can provide real-time pose data of vehicle 100 as it travels, including the positions and orientations (e.g., Euler angles) of vehicle 100 at each time point.

Consistent with the present disclosure, vehicle 100 may be additionally equipped with sensor 160 configured to capture digital images. In some embodiments, sensor 160 may include a camera that takes pictures or otherwise collects image data. For example, sensor 160 may include a monocular, binocular, or panorama camera. Sensor 160 may acquire a plurality of images (each known as an image frame) as vehicle 100 moves along a trajectory. Each image frame may be acquired by sensor 160 at a time point.

Consistent with the present disclosure, vehicle 100 may include a local controller 170 inside body 110 of vehicle 100 or communicate with a remote controller (not illustrated in FIG. 1) for vehicle pose estimation based on point cloud. Consistent with the present disclosure, pose estimation by controller 170 provides improved accuracy and reduced error accumulation. In some embodiments, to improve the accuracy of the point cloud, trajectory interpolation based on the sampling time points of each point cloud frame can be used in aggregating multiple point cloud frames. In some embodiments, for better estimation accuracy of real-time pose information, methods such as Unscented Kalman Filter (UKF) can be implemented to estimate the probability density distribution of a nonlinear function, as opposed to the nonlinear function itself, as well as to preserve the high-order components of the nonlinear function. In some embodiments, closed-loop test can be used in optimizing the pose information associated with each point cloud frame, for example in pose graph optimization, to reduce error accumulation. Moreover, while providing high-accuracy positioning using real-time vehicle pose information, local controller 170 and/or the remote controller can also provide high-accuracy point cloud data by aggregating multiple point cloud frames based on their associated pose information.

Figure 2:
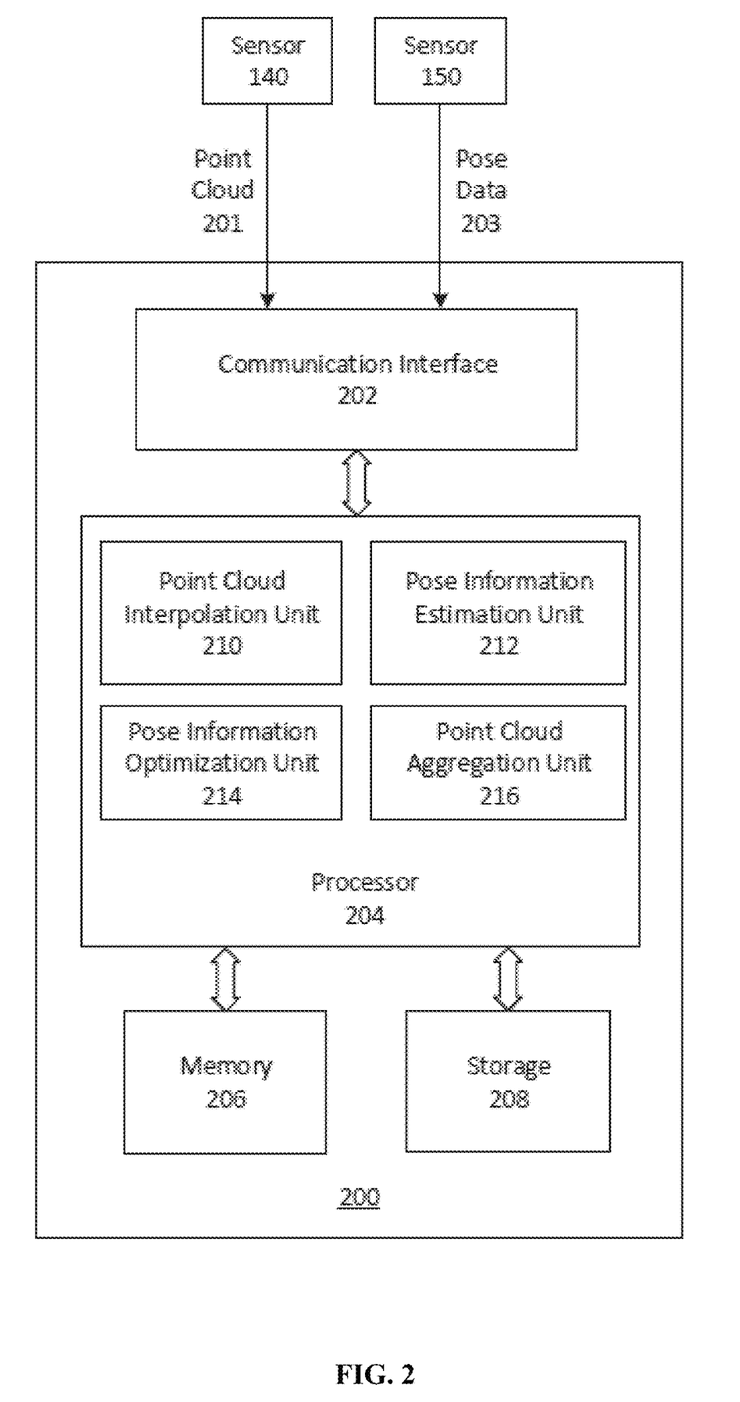
FIG. 2 illustrates a block diagram of an exemplary controller for determining pose information associated with point cloud, according to embodiments of the disclosure.

For example, FIG. 2 illustrates a block diagram of an exemplary controller 200 for determining pose information associated with point cloud, according to embodiments of the disclosure. Consistent with the present disclosure, controller 200 may use various types of data for vehicle pose estimation. The various types of data may be captured by sensors 140-160 equipped on vehicle 100 with respect to the surrounding scene, as vehicle 100 moves along a trajectory. The data may include a point cloud 201 captured by sensor 140 (e.g., a LiDAR scanner) consisting of multiple point cloud frames at various time points. The data may also include initial pose data 203 of vehicle 100 acquired by sensor 150 (e.g., a GPS receiver and/or one or more IMU sensors). In some embodiments, point cloud 201 may be calibrated by transforming the native LiDAR data from a local coordinate system into a global coordinate system (e.g., the longitude/latitude coordinates) based on initial pose data 203 from the GPS receiver and IMU sensors. It is contemplated that additional types of data may be provided to controller 200 for vehicle pose estimation, such as digital images taken by sensor 160 and/or positioning signals from wireless base stations (not shown).

In some embodiments, as shown in FIG. 2, controller 200 may include a communication interface 202, a processor 204, a memory 206, and a storage 208. In some embodiments, controller 200 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of controller 200 may be located inside vehicle 100 (e.g., local controller 170 in FIG. 1) or may be alternatively in a mobile device, in the cloud, or another remote location. Components of controller 200 may be in an integrated device, or distributed at different locations but communicate with each other through a network (not shown). For example, processor 204 may be a processor on-board vehicle 100, a processor inside a mobile device, or a cloud processor, or any combinations thereof.

Communication interface 202 may send data to and receive data from components such as sensors 140-160 via communication cables, a Wireless Local Area Network (WLAN), a Wide Area Network (WAN), wireless networks such as radio waves, a nationwide cellular network, and/or a local wireless network (e.g., Bluetooth™ or WiFi), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive data captured by sensors 140 and 150, including point cloud 201 and initial pose data 203, and provide the received data to memory 206 and storage 208 for storage or to processor 204 for processing. Communication interface 202 may also receive optimized pose information and associated point cloud generated by processor 204, and provide the pose information and associated point cloud to any local component in vehicle 100 or any remote device via a network.

Processor 204 may include any appropriate type of general-purpose or special-purpose microprocessor, digital signal processor, or microcontroller. Processor 204 may be configured as a separate processor module dedicated to estimating vehicle pose. Alternatively, processor 204 may be configured as a shared processor module for performing other functions unrelated to vehicle pose estimation.

As shown in FIG. 2, processor 204 may include multiple modules, such as a point cloud interpolation unit 210, a pose information estimation unit 212, a pose information optimization unit 214, a point cloud aggregation unit 216, and the like. These modules (and any corresponding sub-modules or sub-units) can be hardware units (e.g., portions of an integrated circuit) of processor 204 designed for use with other components or to execute a part of a program. The program may be stored on a computer-readable medium, and when executed by processor 204, it may perform one or more functions. Although FIG. 2 shows units 210-216 all within one processor 204, it is contemplated that these units may be distributed among multiple processors located near or remotely with each other.

Figure 3:
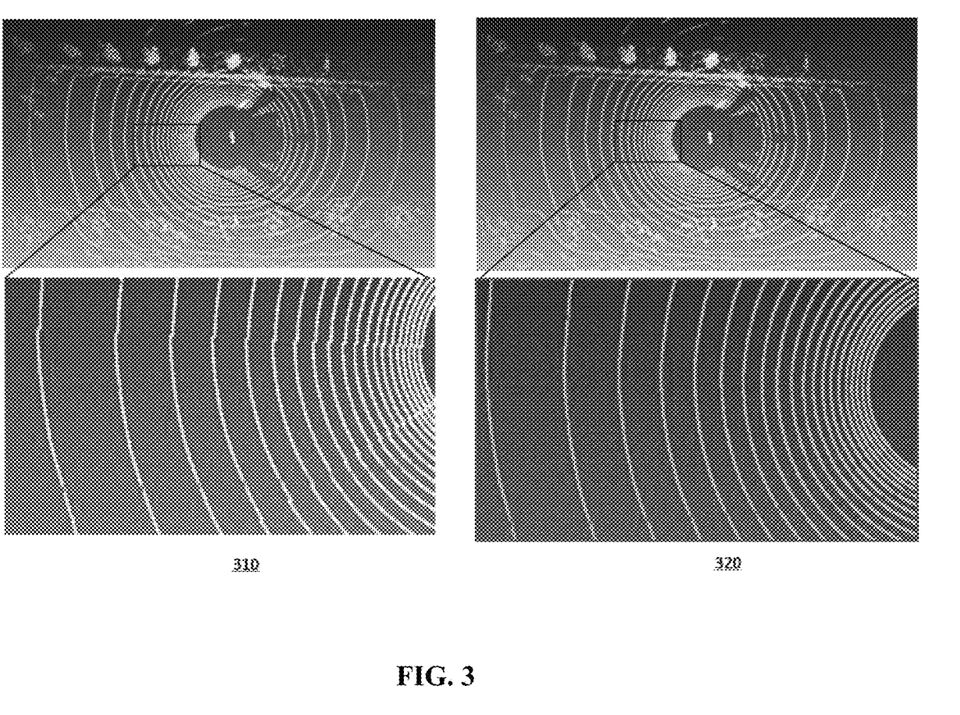
FIG. 3 illustrates an exemplary point cloud frame before and after trajectory interpolation, according to embodiments of the disclosure.

Point cloud interpolation unit 210 may be configured to process the plurality of point cloud frames in point cloud 201 using trajectory interpolation based on initial pose data 203. In some embodiments, a point cloud frame may be associated with multiple shutter time stamps (sampling time points) and thus, include multiple segments each associated with a shutter time stamp. Point cloud interpolation unit 210 may be configured to perform pose transformation for each segment of a point cloud frame using trajectory interpolation to generate a processed point cloud frame with higher accuracy. For example, additional data points in each segment of the point cloud frame may be constructed and inserted using linear interpolation based on the trajectory of vehicle 100 indicated by initial pose data 203 of vehicle 100. For example, FIG. 3 illustrates an exemplary point cloud frame before and after trajectory interpolation, according to embodiments of the disclosure. 310 illustrates a point cloud frame and an enlarged area thereof prior to trajectory interpolation with jagged dislocation. In contrast, 320 illustrates the point cloud frame and enlarged area thereof after trajectory interpolation processed by point cloud interpolation unit 210. The smoothness of the point cloud frame in 320 is improved due to the addition of data points using trajectory interpolation.

Referring back to FIG. 2, pose information estimation unit 212 may be configured to estimate pose information of vehicle 100 associated with each of the point cloud frames based on initial pose data 203 and the point cloud frames. The estimated pose information may be obtained by merging estimation based on the point cloud frames (i.e., point cloud pose information) and estimation based on initial pose data. In some embodiments, pose information estimation unit 212 may first estimate point cloud pose information of vehicle 100 based on the point cloud frames. For example, pose information estimation unit 212 may calculate the pose changes between adjacent point cloud frames based on the 3-D coordinates of the points and their associated attributes (e.g., reflected laser intensity) in each point cloud frame. In one example, four-dimensional (4-D) Normal Distributions Transform (NDT) may be used to calculate the pose change based on X, Y, and Z coordinates and the reflected layer intensities of each point. The 4-D NDT transfers the discrete set of 3-D points reconstructed from a single point cloud frame into a piecewise continuous and differentiable probability density defined in the 3-D space. The probability density may consist of a set of normal distributions that can be easily calculated. The probability density distribution may be used to represent the point cloud pose information of the corresponding point cloud frame.

In some embodiments, pose information estimation unit 212 may then estimate the pose information associated with each point cloud frame based on the point cloud pose information and initial pose data 203. For example, the point cloud pose information and initial pose data 203 may be merged using a UKF method. The UKF method uses a deterministic sampling technique known as the Unscented Transform (UT) to pick a minimal set of sample points (called sigma points) around the posterior mean. The sigma points are then propagated through the nonlinear functions, from which a new posterior mean and covariance estimate are then formed. The resulting UKF filter can more accurately estimate the true mean and covariance. The UKF can determine the posterior mean and covariance accurately to the 3rd order (Taylor series expansion) for any nonlinearity. In contrast, the Extended Kalman Filter (EKF), which has been used by some existing navigation systems for pose estimation, only achieves 1st order accuracy with the computational complexity in the same order as that of the UKF.

Figure 4:
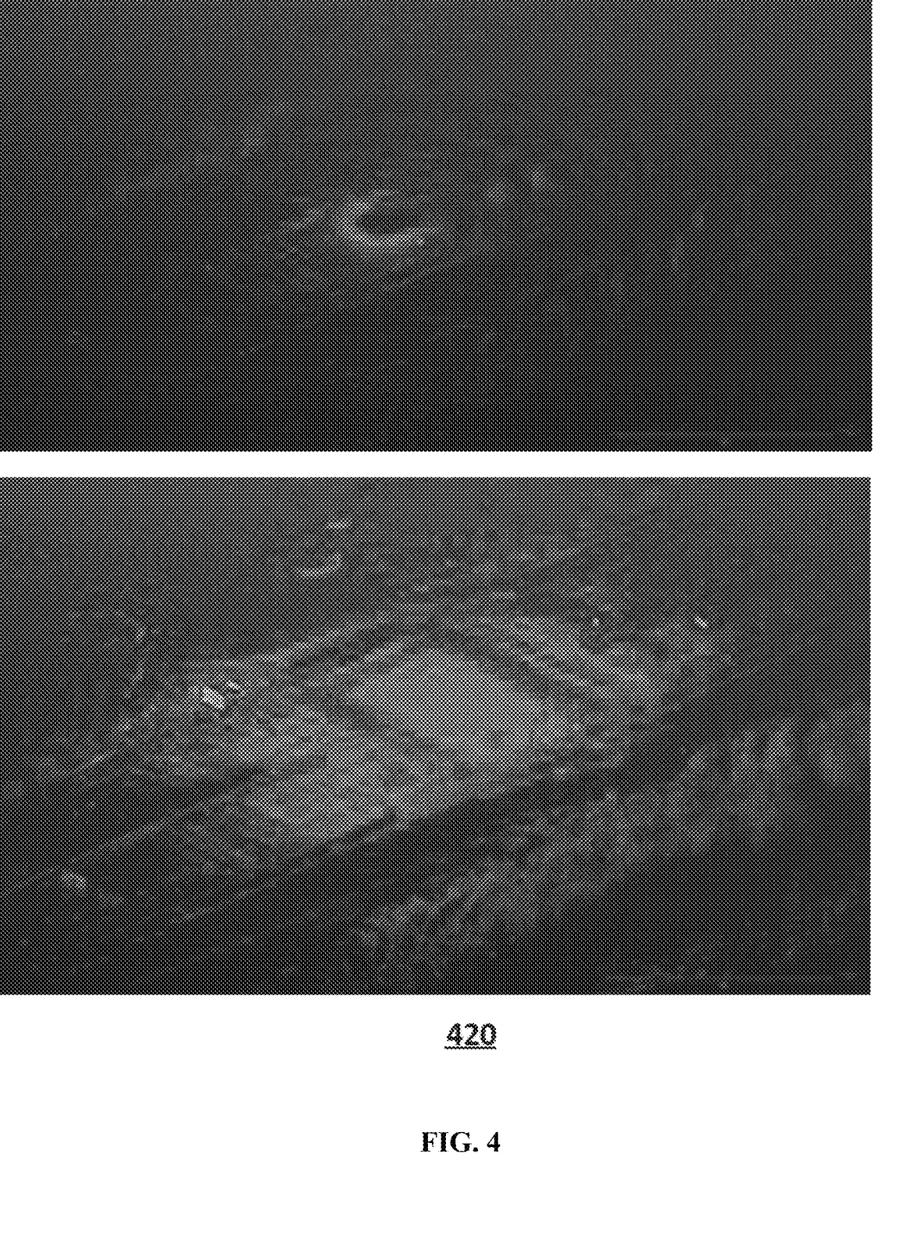
FIG. 4 illustrates an exemplary point cloud aggregated from point cloud frames based on pose information estimated using Normal Distributions Transform (NDT) and Unscented Kalman Filter (UKF), according to embodiments of the disclosure.

By applying the 4-D NDT and UKF in pose estimation, pose information estimation unit 212 can use the probability density distribution of nonlinear function and preserve high-order components in the nonlinear function to achieve higher estimation accuracy without significantly sacrificing the processing speed. In some embodiments, the estimated pose information associated with a point cloud frame may be used for point cloud frame aggregation and segmentation. For example, FIG. 4 illustrates an exemplary point cloud aggregated from point cloud frames based on pose information estimated using NTD and UKF, according to embodiments of the disclosure. 410 illustrates an individual point cloud frame, and 420 illustrates the point cloud frame aggregated with adjacent point cloud frames based on pose information estimated using NTD and UKF.

Referring back to FIG. 2, pose information optimization unit 214 may be configured to adjust the estimated pose information of vehicle 100 associated with each point cloud frame based on a model. The model may include a spatial relationship and a temporal relationship among the point cloud frames. The model may apply closed-loop test to reduce the accumulated positioning error and eventually provide optimized pose information associated with each point cloud frame to eliminate the accumulated positioning error. In some embodiments, pose information optimization unit 214 may first divide the point cloud frames into a plurality of batches based on the spatial relationship and the temporal relationship and a set of thresholds. For example, the set of thresholds may include a minimum time interval t, a minimum position change x, and a minimum orientation change y. The division of the point cloud frames may be based on their spatial change and temporal change against the spatial thresholds x and y, and temporal threshold t. In one example, any point cloud frames that have time interval less than t, position change less than x, and orientation change less than y are in the same batch. By arranging adjacent point cloud frames (both in space and in time) in the same batch for optimization, the computational complexity can be reduced.

In some embodiments, the model used by pose information optimization unit 214 may be a pose graph including a plurality of nodes each representing a pose of a point cloud frame in each batch. In one example, the point cloud frame may be the one with the earliest time point in the batch. Pose information optimization unit 214 may adjust the pose information of each node of the pose graph to reduce the value of the cost function of the pose graph. When the cost function value of the pose graph is minimized, the corresponding pose information of each node of the pose graph reaches its optimized value.

Figure 5:
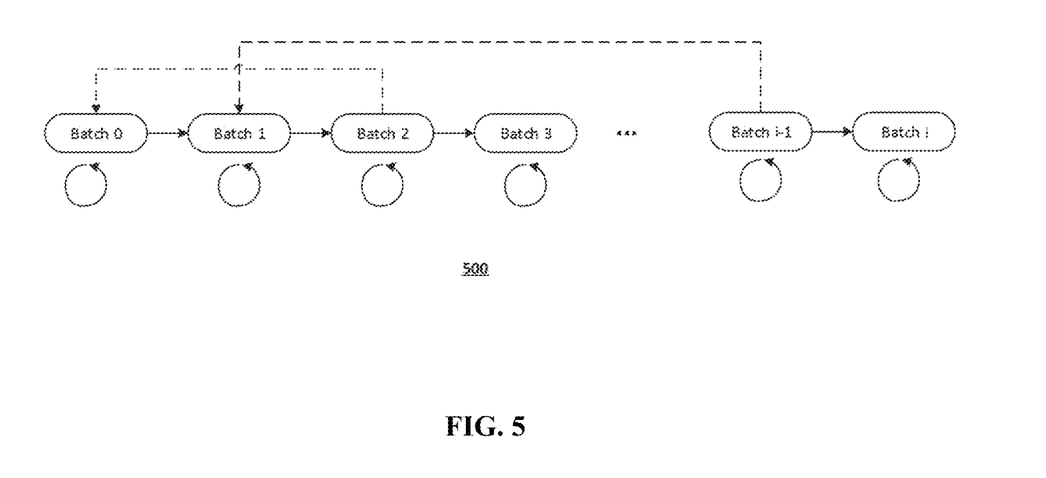
FIG. 5 illustrates an exemplary pose graph, according to embodiments of the disclosure.

FIG. 5 illustrates an exemplary pose graph 500, according to embodiments of the disclosure. Each node of pose graph 500 represents a batch of point cloud frames and is associated with pose information of the first point cloud frame in the batch (e.g., the one with the earliest time point). Pose graph 500 includes three types of edges: (1) The two batches that are adjacent in space but not adjacent in time form a closed-loop. The change of estimated point cloud pose information (e.g., using the 4-D NDT) between the two closed-loop batches is represented as a two-batch edge (shown as a dashed arrow) between the two nodes. For example, Batch 0 and Batch 2 form a closed-loop and is connected by a two-batch edge, and so does Batch 1 and Batch i–1. (2) For each batch, the estimated pose (e.g., prior pose obtained using the UKF) is represented as a one-batch edge (shown as a circle arrow) of the node. For example, each batch in FIG. 5 has its own one-batch edge. (3) The two adjacent batches in pose graph 500 are connected by another two-batch edge (shown as a solid arrow) representing the change of estimated pose information based on initial pose data 203 (e.g., relative prior pose obtained using the UKF). In some embodiments, the total relative prior pose may be used as the cost function for optimizing the pose information of each node of the pose graph.

Figure 6:
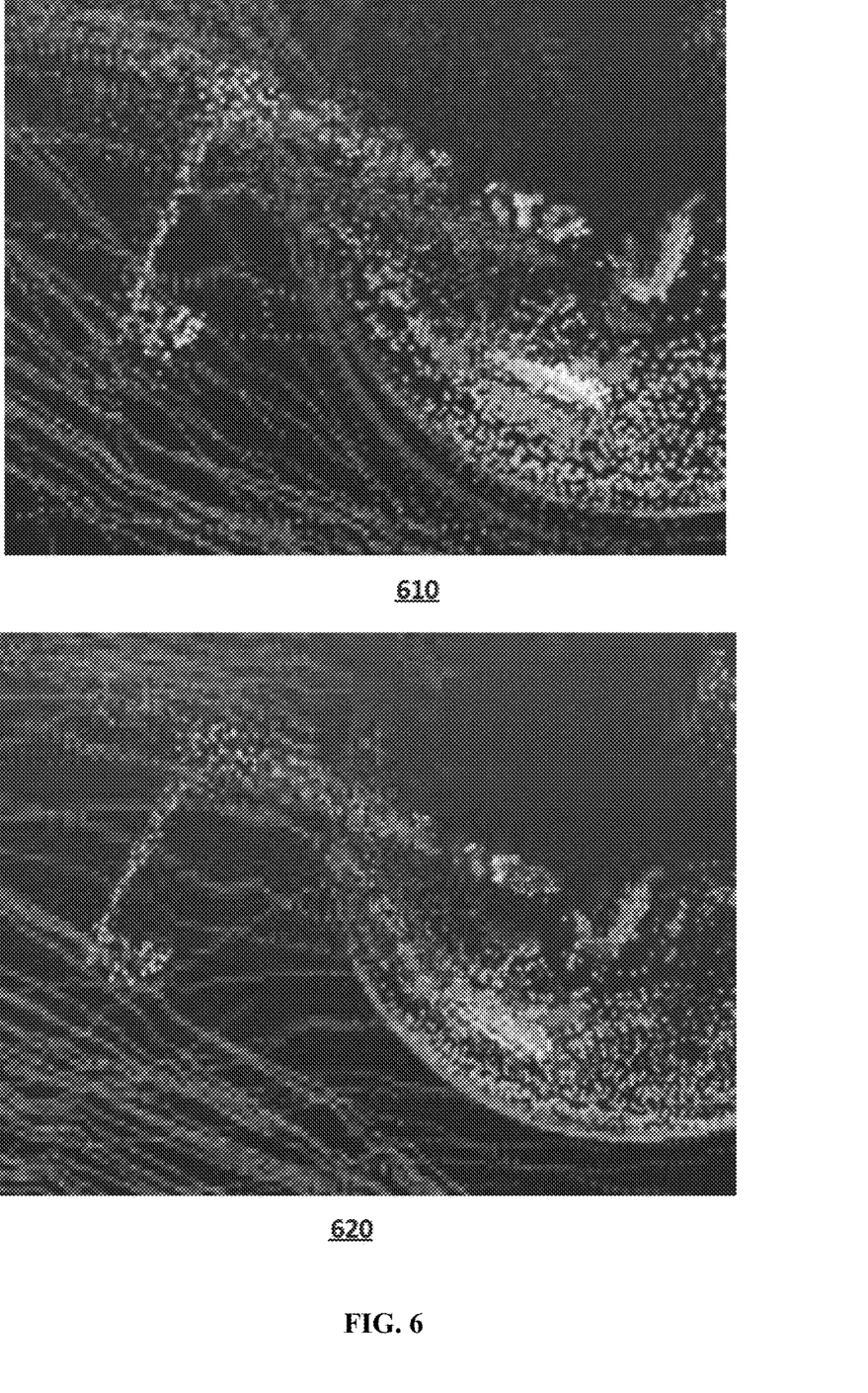
FIG. 6 illustrates an exemplary point cloud associated with unoptimized pose information and optimized pose information, according to embodiments of the disclosure.

FIG. 6 illustrates an exemplary point cloud associated with unoptimized pose information and optimized pose information, according to embodiments of the disclosure. 610 illustrates a point cloud associate with unoptimized pose information, and 620 illustrates the same point cloud associated with the optimized pose information. The pose information is optimized using the pose graph as shown in FIG. 5.

Referring back to FIG. 2, point cloud aggregation unit 216 may be configured to register the adjusted pose information with each point cloud frame and aggregate the point cloud frames based on their adjusted pose information. That is, in addition to estimating the pose of vehicle 100 for high-accuracy positioning, controller 200 can also aggregate the point cloud frames based on their associated pose information to provide high-accuracy point cloud data. Each point cloud frame thus may be registered with the optimized pose information, such as the position and orientation of vehicle 100 and the time point where the point cloud frame is captured. In some embodiments, point cloud frames that are adjacent in space may be aggregated based on their optimized pose information.

Referring back to FIG. 2, memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform vehicle pose estimation functions disclosed herein. For example, memory 206 and/or storage 208 may be configured to store program(s) that may be executed by processor 204 to control sensors 140-160 to capture various types of data when vehicle 100 moves along a trajectory, and process the captured data to estimate the pose information of vehicle 100.

Memory 206 and/or storage 208 may be further configured to store information and data used by processor 204. For instance, memory 206 and/or storage 208 may be configured to store the various types of data captured by sensors 140-160 and the estimated pose information. The various types of data may be stored permanently, removed periodically, or disregarded immediately after each frame of data is processed.

Figure 7:
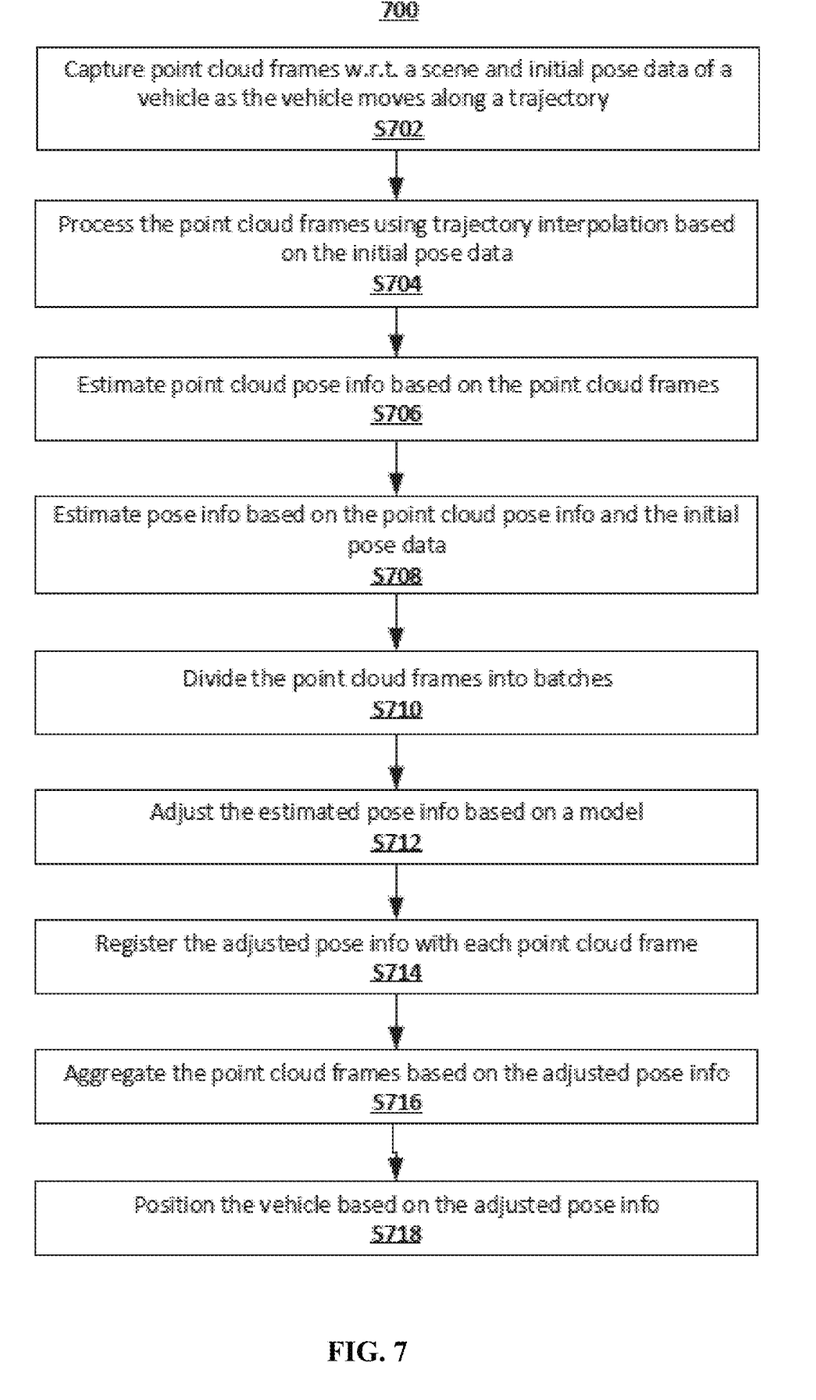
FIG. 7 illustrates a flowchart of an exemplary method for providing pose information associated with point cloud, according to embodiments of the disclosure.

FIG. 7 illustrates a flowchart of an exemplary method 700 for positioning vehicle 100 based on estimated pose information associated with point cloud, according to embodiments of the disclosure. For example, method 700 may be implemented by a vehicle pose estimation system of vehicle 100 that includes, among other things, controller 200 and sensors 140 and 150. However, method 700 is not limited to that exemplary embodiment. Method 700 may include steps S702-S718 as described below. It is to be appreciated that some of the steps may be optional to perform the disclosure provided herein. Further, some of the steps may be performed simultaneously, or in a different order than shown in FIG. 7.

In step S702, a plurality of point cloud frames with respect to a scene and initial pose data of vehicle 100 may be captured by sensors 140 and 150 associated with vehicle 100, as vehicle 100 moves along a trajectory. For example, a LiDAR scanner equipped on vehicle 100 may capture the point cloud frames representing the 3-D information of the scene. A GPS receiver and one or more IMU sensors equipped on vehicle 100 may acquire the initial pose data of vehicle 100, including time, positions, and orientations. In some embodiments, prior to capturing the data, sensors 140 and 150 may be calibrated to obtain the relative pose transformation.

In step S704, the point cloud frames may be processed, by processor 204, using trajectory interpolation based on the initial pose data. The initial pose data may be used to indicate the trajectory of vehicle 100. Various interpolation approaches, such as piecewise constant interpolation, linear interpolation, spline interpolation, etc. may be used to construct new data points within the range of a point cloud frame based on the trajectory and sampling time points. The new data points may supplement the point cloud frame to improve the smoothness of the point cloud.

In step S706, point cloud pose information may be estimated, by processor 204, based on the point cloud frames. The point cloud pose information estimation may be performed based on the 3-D coordinates and associated attributes (e.g., the reflected laser intensity) of each point in a point cloud frame. The change of point cloud pose information between two or more point cloud frames that are adjacent in space may be estimated as well. In some embodiments, the 4-D NDT may be used to estimate the point cloud pose information. The 4-D NDT may estimate the point cloud pose information based on the probability density distribution of a nonlinear function, as opposed to the nonlinear function itself.

In step S708, pose information associated with each point cloud frame may be estimated, by processor 204, based on the point cloud pose information and the initial pose data. In some embodiments, the point cloud pose information may be merged with the initial pose data using the UKF to preserve the high-order components of the nonlinear function in estimating the pose information associated with each point cloud frame. The estimated pose information may be used as the initial values for later optimization.

In step S710, the point cloud frames may be divided, by processor 204, into a plurality of batches. The division of the point cloud frames may be performed based on the spatial and temporal relationships, such as the changes in space and time, among the point cloud frames. In one example, any point cloud frames that correspond to time interval less than a temporal threshold, position change less than a position threshold, and orientation change less than an orientation threshold are assigned to the same batch. As a result, each batch may include one or more point cloud frames that are adjacent in space and in time. In some embodiments, one of the point cloud frames in each batch that has the earliest time point may be considered as the first point cloud frame of the batch, and the pose information of the first point cloud frame may be used as the pose information associated with the batch.

In step S712, the estimated pose information associated with each point cloud frame may be adjusted, by processor 204, based on a model. The model may include a spatial relationship and a temporal relationship among the point cloud frames. In some embodiments, the model may be represented by a pose graph including a plurality of nodes each representing a pose of a point cloud frame in each of the plurality of batches. The pose graph may also include various types of edges connecting the nodes, such as two-batch edges connecting closed-loop batches representing the change of estimated point cloud pose information, two-batch edges connecting adjacent batches representing the change of estimated pose information, and one-batch edges representing the estimated pose of each node. In some embodiments, the total relative prior pose (represented by the two-batches edges connecting adjacent batches) may be used as the cost function for optimizing the pose information of each node of the pose graph. The estimated pose information may be adjusted to reduce the value of the cost function until the value is minimized.

In step S714, the adjusted pose information may be registered, by processor 204, with each point cloud frame. In Step S716, the point cloud frames may be aggregated, by processor 204, based on the adjusted pose information associated with each point cloud frame. For example, point cloud frames that are adjacent in space as indicated by their associated pose information may be aggregated. In step S718, vehicle 100 may be positioned, by processor 204, based on the adjusted pose information. In some embodiments, the adjusted pose information may have its optimized values, and vehicle 100 may be positioned with high accuracy.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A navigation system for positioning a vehicle, comprising:
    a communication interface configured to receive a plurality of point cloud frames with respect to a scene and initial pose data of the vehicle captured by a plurality of sensors equipped on the vehicle as the vehicle moves along a trajectory;
    a storage configured to store the plurality of point cloud frames and the initial pose data; and a processor configured to:
estimate pose information of the vehicle associated with each of the plurality of point cloud frames based on the initial pose data and the plurality of point cloud frames;
adjust the estimated pose information of the vehicle based on a model, wherein the model optimizes the estimated pose information by dividing the plurality of point cloud frames into batches based on a spatial relationship and a temporal relationship among the plurality of point cloud frames; and
position the vehicle based on the adjusted pose information.

2. The system of claim 1, wherein the processor is further configured to:
register the adjusted pose information of the vehicle with each of the plurality of point cloud frames; and
aggregate the plurality of point cloud frames based on the adjusted pose information.

3. The system of claim 1, wherein to estimate the pose information of the vehicle, the processor is further configured to process the plurality of point cloud frames using trajectory interpolation based on the initial pose data.

4. The system of claim 1, wherein to estimate the pose information of the vehicle, the processor it further configured to:
estimate point cloud pose information of the vehicle based on the plurality of point cloud frames; and
estimate the pose information based on the point cloud pose information and the initial pose data.

5. The system of claim 4, wherein the point cloud pose information is estimated using four-dimensional (4-D) Normal Distributions Transform (NDT), and the pose information is estimated using Unscented Kalman Filter (UKF).

6. The system of claim 1, wherein dividing the plurality of point cloud frames into a plurality of batches is further based on a set of thresholds.

7. The system of claim 6, wherein the model is represented by a pose graph including a plurality of nodes each representing a pose of a point cloud frame in each of the plurality of batches.

8. A method for positioning a vehicle, comprising:
receiving a plurality of point cloud frames with respect to a scene and initial pose data of the vehicle captured by a plurality of sensors associated with the vehicle, as the vehicle moves along a trajectory;
estimating, by a processor, pose information of the vehicle associated with each of the plurality of point cloud frames based on the initial pose data and the plurality of point cloud frames;
adjusting, by the processor, the estimated pose information of the vehicle based on a model, wherein the model optimizes the estimated pose information by dividing the plurality of point cloud frames into batches based on a spatial relationship and a temporal relationship among the plurality of point cloud frames; and
positioning, by the processor, the vehicle based on the adjusted pose information.

9. The method of claim 8, further comprising:
registering the adjusted pose information of the vehicle with each of the plurality of point cloud frames; and
aggregating the plurality of point cloud frames based on the adjusted pose information.

10. The method of claim 8, wherein estimating the pose information of the vehicle comprises processing the plurality of point cloud frames using trajectory interpolation based on the initial pose data.

11. The method of claim 8, wherein estimating the pose information of the vehicle comprises:
estimating point cloud pose information of the vehicle based on the plurality of point cloud frames; and
estimating the pose information based on the point cloud pose information and the initial pose data.

12. The method of claim 11, wherein the point cloud pose information is estimated using 4-D NDT, and the pose information is estimated using UKF.

13. The method of claim 8, wherein dividing the plurality of point cloud frames into a plurality of batches is further based on a set of thresholds.

14. The method of claim 13, wherein the model is represented by a pose graph including a plurality of nodes each representing a pose of a point cloud frame in each of the plurality of batches.

15. A non-transitory computer-readable medium having instructions stored thereon that, when executed by one or more processors, causes the one or more processors to perform operations comprising:
receiving a plurality of point cloud frames with respect to a scene and initial pose data of a vehicle captured by a plurality of sensors associated with the vehicle, as the vehicle moves along a trajectory;
estimating pose information of the vehicle associated with each of the plurality of point cloud frames based on the initial pose data and the plurality of point cloud frames;
adjusting the estimated pose information of the vehicle based on a model, wherein the model optimizes the estimated pose information by dividing the plurality of point cloud frames into batches based on a spatial relationship and a temporal relationship among the plurality of point cloud frames; and
positioning the vehicle based on the adjusted pose information.

16. The computer-readable medium of claim 15, wherein the operations further comprise:
registering the adjusted pose information of the vehicle with each of the plurality of point cloud frames; and
aggregating the plurality of point cloud frames based on the adjusted pose information.

17. The computer-readable medium of claim 15, wherein estimating the pose information of the vehicle comprises processing the plurality of point cloud frames using trajectory interpolation based on the initial pose data.

18. The computer-readable medium of claim 15, wherein estimating the pose information of the vehicle comprises:
estimating point cloud pose information of the vehicle based on the plurality of point cloud frames; and
estimating the pose information based on the point cloud pose information and the initial pose data.

19. The computer-readable medium of claim 15, wherein dividing the plurality of point cloud frames into a plurality of batches is further based on a set of thresholds.

20. The computer-readable medium of claim 19, wherein the model is represented by a pose graph including a plurality of nodes each representing a pose of a point cloud frame in each of the plurality of batches.

* * * * *